United States Patent
Wilmore

(10) Patent No.: US 6,936,933 B2
(45) Date of Patent: Aug. 30, 2005

(54) HYBRID PROPULSION SYSTEM FOR A MOTOR VEHICLE

(75) Inventor: Melvyn Wilmore, Heusden (BE)

(73) Assignee: Volvo Lastvagnar AB, Göteborg (SE)

(*) Notice: Subject to any disclaimer, the term of this patent is extended or adjusted under 35 U.S.C. 154(b) by 0 days.

(21) Appl. No.: 10/249,354

(22) Filed: Apr. 2, 2003

(65) Prior Publication Data

US 2004/0251758 A1 Dec. 16, 2004

Related U.S. Application Data

(63) Continuation of application No. PCT/SE01/02072, filed on Sep. 25, 2001.

(30) Foreign Application Priority Data

Oct. 2, 2000 (SE) .............................................. 0003572

(51) Int. Cl.⁷ .............................. H20P 9/04; H20K 21/26
(52) U.S. Cl. ............................. 290/46; 290/22; 290/31; 310/83; 310/267; 310/78; 310/92; 310/100; 310/154.33; 475/13; 74/467
(58) Field of Search .............................. 290/46, 22, 31; 310/83, 267, 78, 92, 100, 154.33; 475/13; 74/467

(56) References Cited

U.S. PATENT DOCUMENTS

| 4,602,174 A | | 7/1986 | Redlich |
| 5,418,400 A | * | 5/1995 | Stockton .................... 290/46 |
| 5,818,132 A | * | 10/1998 | Konotchick .................. 310/17 |
| 6,504,258 B2 | * | 1/2003 | Schultz et al. ............. 290/1 R |

FOREIGN PATENT DOCUMENTS

| EP | 0743216 A2 | 11/1996 |
| EP | 1102385 A2 | 5/2001 |
| WO | WO 9709191 A1 | 3/1997 |
| WO | WO 9922955 A1 | 5/1999 |
| WO | WO 0034066 A1 | 6/2000 |

* cited by examiner

*Primary Examiner*—Darren Schuberg
*Assistant Examiner*—Iraj A. Mohandesi
(74) *Attorney, Agent, or Firm*—Novak Druce & Quigg LLP

(57) ABSTRACT

Arrangement for providing an integrated starter generator apparatus for producing electrical power and/or rotational torque. The apparatus includes a primary rotor (18) arranged for cooperation with a primary stator (16), and a secondary rotor (20) arranged for cooperation with a secondary stator (17). A one-way clutch (19) is disposed between the primary rotor (18) and the secondary rotor (20) that permits both rotors to be locked together in one direction of rotation, and that allows them to operate independently in the opposite direction of rotation.

9 Claims, 3 Drawing Sheets

Figure 1:
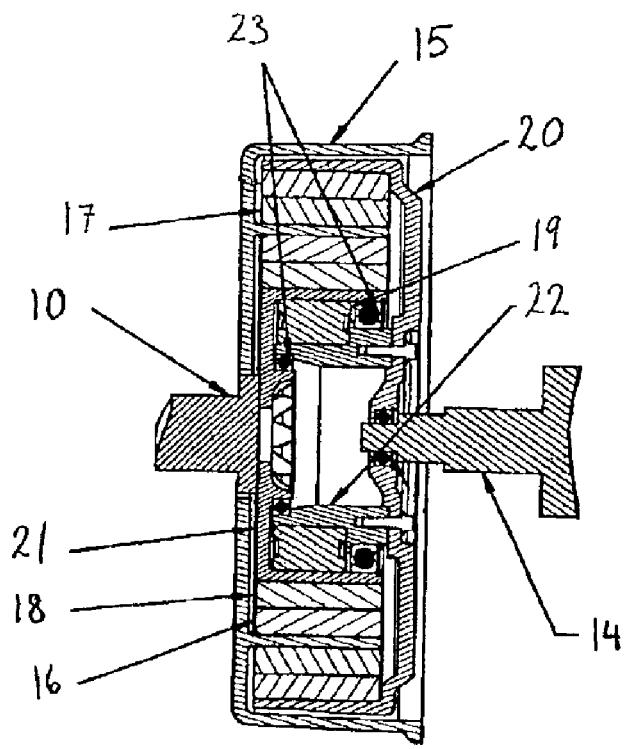
Figure 2:
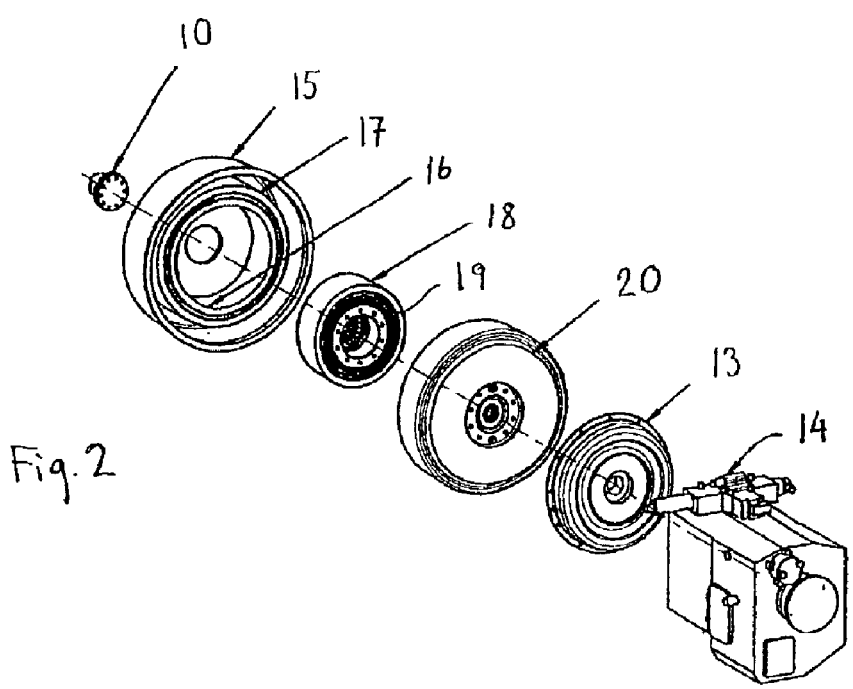
Figure 3:
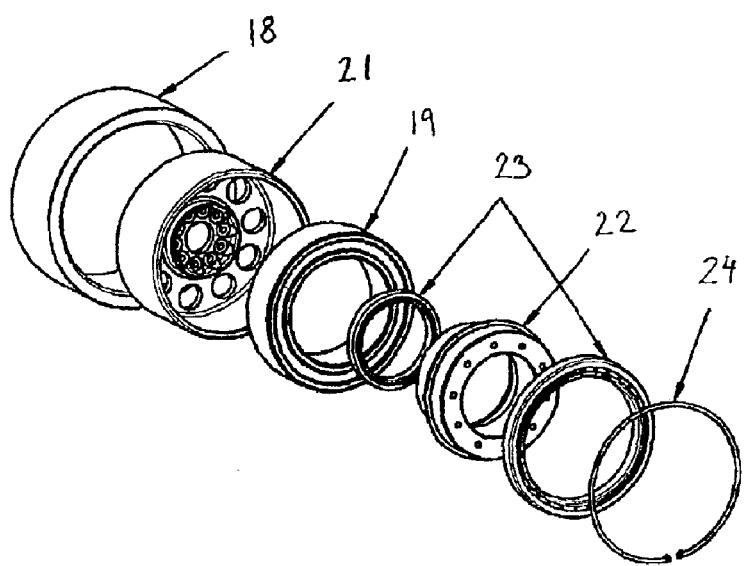

HYBRID PROPULSION SYSTEM FOR A MOTOR VEHICLE

CROSS REFERENCE TO RELATED APPLICATIONS

The present application is a continuation patent application of International Application No. PCT/SE01/02072 filed 25 Sep. 2001 which was published in English pursuant to Article 21(2) of the Patent Cooperation Treaty and which claims priority to Swedish Patent Application No. 0003572-5 filed 2 Oct. 2000. Both applications are expressly incorporated herein by reference in their entireties.

BACKGROUND OF INVENTION

1. Technical Field

The present invention relates to an integrated starter generator apparatus for producing electrical power and/or rotational torque. The apparatus includes a primary rotor arranged for cooperation with a primary stator, and a secondary rotor arranged for cooperation with a secondary stator. The invention also relates to a propulsion system for a motor vehicle including the integrated starter generator apparatus.

2. Background of the Invention

On a parallel hybrid road vehicle using an internal combustion engine (ICE) and, for example, an integrated starter generator (ISG), it can be desirable to be able to disconnect the ICE from the ISG in order to drive the vehicle using electrical power only. Thus, it must be possible to stop the ICE, then drive using the ISG as a traction motor, and when needed to be able to restart the ICE and to reconnect power transmission.

WO 99/22955 discloses a hybrid propulsion system for a motor vehicle provided with an integrated starter generator apparatus. This apparatus includes a single stator-rotor unit and two independently controllable, axially arranged clutches.

This and other types of known integrated starter generator apparatuses increase the length of the propulsion system, especially when a large electrical power capacity is needed.

SUMMARY OF INVENTION

A need exists for an integrated starter generator apparatus having a large electrical power capacity as well as being longitudinally compact. To fulfill this objective, an integrated starter generator apparatus configured according to the present invention is characterized in that it includes a one-way clutch disposed between the primary rotor and the secondary rotor thereby permitting both rotors to be locked together in one direction of rotation, but also allowing them to operate independently in the opposite direction of rotation.

According to an advantageous embodiment of the invention, the clutch and the primary and secondary rotors are concentrically arranged about a common axis of rotation.

BRIEF DESCRIPTION OF DRAWINGS

The invention will be further described in the following, in a non-limiting way with reference to the accompanying drawings in which:

FIG. 1 is a cross-sectional view showing a propulsion system configured according to the present invention;

FIG. 2 is an exploded perspective view of the propulsion system of FIG. 1; and FIG. 3 is a detailed exploded perspective view of the integrated starter generator portion of the apparatus configured according to the invention.

DETAILED DESCRIPTION

An integrated starter generator apparatus that is configured according to the teachings of the present invention enables the automatic connection and disconnection of the power transmission between an internal combustion engine and the alternative drive machine in a hybrid road vehicle.

FIGS. 1 and 2 show the major components of a preferred embodiment of the inventive apparatus and propulsion system. The output shaft 10 of an internal combustion engine is connected via an integrated starter generator apparatus and a clutch 13 to a gearbox 14.

A housing 15 comprises a primary stator 16 and a secondary stator 17. A primary rotor 18 is adapted to be mounted on the shaft 10 for rotation inside the primary stator 16. The primary rotor 18 is provided with a centrally arranged one-way clutch 19. A secondary rotor 20 is adapted to be mounted on the clutch 19 so that both rotors are locked together in one direction of rotation and able to operate independently in the opposite direction of rotation. The secondary rotor 20 forms the attachment point for the clutch 13 that is used as a conventional clutch when selecting different gears in the gearbox 14 for driving at different speeds.

FIG. 3 is an exploded view of the primary rotor 18 with one-way clutch 19. The clutch 19 is mounted inside a cylindrical flywheel mass 21 with a clutch core 22 riding on bearings 23 and the clutch assembly is locked inside the flywheel by means a circlip 24.

As may be best appreciated in FIG. 1, the primary 16, 18 and secondary 17, 20 rotor-stator pairs and the one-way clutch 19 are concentrically arranged about a common rotary axis (shown as a dash-dot line in FIG. 2). In order to achieve the most compact width-wise dimension for the integrated starter generator, the primary and secondary rotor-stator pairs and the one-way clutch are each relatively positioned to be substantially radially aligned about the rotary axis thereby establishing a width-wise overlapped arrangement therebetween. Still further, the primary and secondary rotor-stator pairs and the one-way clutch each have a width that is substantially equal to a width of the integrated starter generator. In this context, it should be appreciated that the term substantially is utilized to indicate that the several widths do not necessarily have to be exactly equal when so described, but they should be so nearly equal that when in the overlapped configuration, the total width of the assembly does not vary greatly from any one of the required constituent components.

Below is a description of the major basic modes for a hybrid vehicle using the propulsion system configured according to the invention; but there are, of course, other modes that are not expressly included.

In an internal combustion engine (ICE) start mode, the internal combustion engine can be started by energizing the primary integrated starter generator (ISG) stator 16.

In a conventional ICE drive mode, when the ICE is running, the one-way roller clutch 19 locks the drive so that the engine flywheel and the secondary ISG rotor 20 rotate together. This enables full electrical power to be generated by the ISG.

In an electric Vehicle (EV) mode, the ICE can be stopped. The secondary ISG stator 17 can be energized and EV drive is enabled by the secondary rotor. In this mode, the one-way roller clutch 19 unlocks, disconnecting the drive between the ICE and secondary ISG rotor 20. This mode can also be used for a creep function in very dense or slow moving traffic.

In a vehicle coasting mode, for instance when going downhill and the throttle is released, the ICE will go to idle and the one-way clutch will unlock and become a freewheel. In this mode, the primary ISG continues to generate power at a low level, and the secondary ISG can either be used as a retarder if the vehicle speed must be reduced, or as a means of recuperating some of the vehicle's energy.

In general, the invention provides the following functionality. Normally required flywheel effect is maintained even when the drive connection is separated. Adequate mechanical support and location is maintained for the ISG rotor when drive is disconnected. Coupling/decoupling can occur completely automatically. Coupling/decoupling device may be maintenance free. ICE restarts is possible by energizing part of ISG stator without having any effect on the electrical drive.

The invention is not limited to the above-described embodiments, but several modifications are possible within the scope of the following claims.

What is claimed is:

1. An integrated starter generator for producing electrical power and/or rotational torque comprising:
   a primary rotor arranged for cooperation with a primary stator, and a secondary rotor arranged for cooperation with a secondary stator;
   a one-way clutch disposed between the primary rotor and the secondary rotor, the one-way clutch configured to permit both rotors to be locked together in one direction of rotation and to allow both rotors to operate independently in the opposite direction of rotation; and
   both rotors configured to provide flywheel mass when connected to a drive engine.

2. The integrated starter generator according to claim 1, wherein the clutch and the primary and secondary rotors are concentrically arranged about a common axis of rotation.

3. The integrated starter generator according to claim 2, wherein one of both rotors is connectable to an output shaft of a drive engine.

4. The integrated starter generator according to claim 1, wherein the other of both rotors is connectable to a vehicle transmission.

5. An integrated starter generator adapted for installation in a hybrid vehicle and for alternatively generating electrical power from, and providing rotational drive torque to an incorporating hybrid vehicle, the integrated starter generator comprising:
   primary and secondary rotor-stator pairs connectable together for alternatively generating electrical power from, and providing rotational drive torque to an incorporating hybrid vehicle;
   a one-way clutch disposed between the rotor-stator pairs thereby causing co-rotation in one direction and permitting opposed rotation in the other direction; and
   the primary and secondary rotor-stator pairs and the one-way clutch being concentrically arranged about a common rotary axis.

6. The integrated starter generator according to claim 5, further comprising:
   the primary and secondary rotor-stator pairs and the one-way clutch each having a width substantially equal to a width of the integrated starter generator.

7. The integrated starter generator according to claim 5, further comprising:
   the primary and secondary rotor-stator pairs and the one-way clutch each being substantially radially aligned thereby establishing a width-wise overlapped arrangement between the primary and secondary rotor-stator pairs and the one-way clutch.

8. An integrated starter generator adapted for installation in a hybrid vehicle and for alternatively generating electrical power from, and providing rotational drive torque to an incorporating hybrid vehicle, the integrated starter generator comprising:
   primary and secondary rotor-stator pairs connectable together for alternatively generating electrical power from, and providing rotational drive torque to an incorporating hybrid vehicle;
   a one-way clutch disposed between the rotor-stator pairs thereby causing co-rotation in one direction and permitting opposed rotation in the other direction; and
   the primary and secondary rotor-stator pairs and the one-way clutch each having a width substantially equal to a width of the integrated starter generator.

9. The integrated starter generator according to claim 8, further comprising:
   the primary and secondary rotor-stator pairs and the one-way clutch each being substantially radially aligned thereby establishing a width-wise overlapped arrangement between the primary and secondary rotor-stator pairs and the one-way clutch.

* * * * *